3,538,154
PREPARATION OF [4-(2,2-DIACYLVINYL)PHE-
NOXY]-ACETIC ACIDS
Edward J. Cragoe, Jr., and John B. Bicking, Lansdale, Pa.,
assignors to Merck & Co., Inc., Rahway, N.J., a corporation of New Jersey
No Drawing. Filed Mar. 1, 1967, Ser. No. 619,563
Int. Cl. C07c 65/20
U.S. Cl. 260—521                                10 Claims

ABSTRACT OF THE DISCLOSURE

This invention relates to a method for the preparation of [4-(2,2-diacylvinyl)phenoxy]acetic acid products via the pyrolysis of the tertiary-butyl ester derivatives thereof in the presence of an acid. The products thus obtained are diuretic and saluretic agents which can be used in the treatment of conditions associated with electrolyte and fluid retention.

---

This invention relates to a novel method for the preparation of [4-(2,2-diacylvinyl)phenoxy]acetic acids (I, infra) and, also, to the preparation of the nontoxic, pharmacologically acceptable salts, esters and amide derivatives thereof.

The products of this invention are diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The instant process consists in pyrolyzing a tertiary-butyl ester of a [4-(2,2-diacylvinyl)phenoxy]acetic acid (II, infra) by heating the said ester in the presence of a strong acid as, for example, in the presence of p-toluenesulfonic acid, sulfuric acid, benzenesulfonic acid, gaseous hydrogen chloride, etc. In general, pyrolysis is effected by heating at temperatures in the range of from about 70–140° C. and, preferably, in the range of from about 80–100° C. Also, the reaction may be conducted without a solvent or in the presence of a suitable nonaqueous medium in which the reactants are reasonably soluble as, for example, in the presence of benzene, toluene, xylene, etc. The following equation illustrates the process:

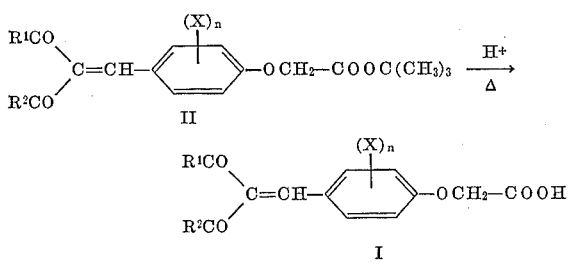

wherein $R^1$ and $R^2$ are alkyl, for example, lower alkyl such as methyl, ethyl, propyl, isopropyl, butyl, pentyl, etc.; the X radicals are similar or dissimilar members selected from hydrogen, halogen, for example, chlorine, bromine, fluorine, iodine, etc.; lower alkyl, for example, methyl, ethyl, propyl, etc.; and, taken together, two X radicals on adjacent carbon atoms of the benzene ring may be joined to form a 1,3-butadienylene chain, i.e.,

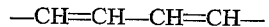

$H^+$ is the cation derived from an organic or inorganic acid such as p-toluenesulfonic acid, sulfuric acid, benzenesulfonic acid, gaseous hydrogen chloride, etc.; and $n$ is an integer having a value of 1–2.

A preferred embodiment of this invention consists in pyrolyzing the tert.-butyl ester of a [2,3-dihalo-4-(2,2-diacylvinyl)phenoxy]acetic acid (IIa, infra) by heating at temperatures in the range of from about 80–100° C. in a suitable nonaqueous solvent in the presence of a strong acid according to the following equation:

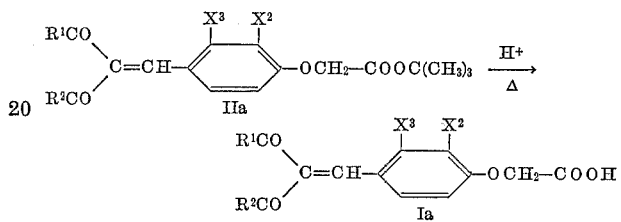

wherein $X^2$ and $X^3$ are halogen and $R^1$, $R^2$, and $H^+$ are as defined above. The foregoing class of compounds (Ia) exhibits particularly good diuretic and saluretic activity and, therefore, constitutes a preferred subgroup of compounds within this invention.

The tert.-butyl [4-(2,2-diacylvinyl)phenoxyl]acetate starting materials (II) of the foregoing process are conveniently obtained by treating an appropriate 2-(4-hydroxybenzylidene)-1,3-di-ketone (III, infra) with tert.-butyl haloacetate in the presence of a weak base such as potassium carbonate, sodium bicarbonate, etc. and, preferably, in the presence of a suitable solvent such as dimethylformamide. The following equation illustrates the process:

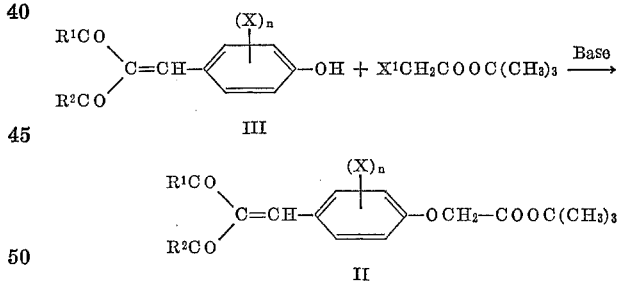

wherein $X^1$ is halogen, for example, chlorine, bromine, iodine, etc. and $R^1$, $R^2$, X and $n$ are as defined above.

The 2-(4-hydroxybenzylidene)-1,3-di-ketone intermediates (III) are conveniently obtained by the reaction of an appropriate nuclear hydroxy substituted benzaldehyde (IV, infra) with a diacylmethane in the presence of a catalyst. Suitable catalysts include, for example, amines such as piperidine, morpholine, etc., sodium alcoholates or amine salts of carboxylic acids, for example, piperidine acetate, etc. When the catalyst employed is a base such as an amine or a sodium alcoholate the reaction is generally carried out in an alcohol solvent such as a lower alkanol or in dimethylformamide and, preferably, at ambient temperatures or at temperatures slightly above ambient temperature. Alternatively, when the catalyst is an amine salt of a carboxylic acid it is most advantageous to employ a water-immiscible solvent in which the reactants are reasonably soluble; suitable solvents include benzene, toluene and xylene or mixtures of the foregoing with acetic acid, dimethylformamide, etc. The following equation illustrates the process:

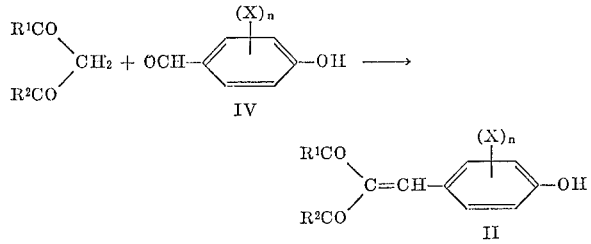

wherein $R^1$, $R^2$, X and $n$ are as defined above. Also, it has been found advantageous to remove the water formed during the condensation of the diacylmethane with the nuclear hydroxy substituted benzaldehyde (IV) as, for example, by the use of chemical dehydrating agents, molecular sieves or by azeotropic distillation. Further, the reaction may be conducted at ambient temperatures but, in general, it is most advantageous to conduct the reaction at elevated temperatures as, for example, at the reflux temperature of the solvent system.

The nuclear hydroxy substituted benzaldehyde intermediates (IV) are either known compounds or may be synthesized by methods which are known to those skilled in the art. For example, by treating phenol or an appropriate nuclear substituted derivative thereof (V, infra) with chloroform in the presence of an aqueous solution of a base and then treating the resulting mixture with an acid such as hydrochloric acid the corresponding nuclear hydroxy substituted benzaldehyde is obtained. Alternatively, the said hydroxy substituted benzaldehyde compounds (IV) may be obtained by the reaction of a phenol or an appropriate nuclear substituted phenol with hydrogen cyanide and hydrogen chloride (gas) in the presence of anhydrous aluminum chloride. Preferably, this reaction is conducted in an inert solvent as, for example, in a benzene solution. The following equation illustrates these methods of preparation:

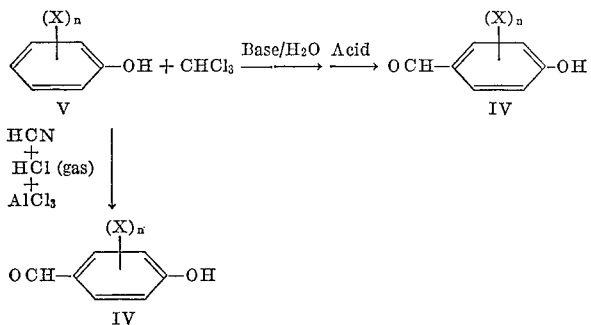

wherein X and $n$ are as defined above.

The [4-(2,2-diacylvinyl)phenoxy]acetic acid products of the invention are generally obtained as crystalline solids and, if desired, may be purified by recrystallization from suitable solvents. Suitable solvents include, for example, ethyl acetate, isopropyl alcohol, nitromethane, acetic acid, acetonitrile, etc. or mixtures of solvents such as a mixture of ethyl acetate and hexane or a mixture of butanone and hexane, etc.

Included within this invention are the nontoxic, pharmacologically acceptable salts of the instant products (I). Any base which will form an acid addition salt with the [4-(2,2-diacylvinyl)phenoxy]acetic acids (I) and whose pharmacological properties will not cause an adverse physiological effect in the body system is considered as being within the scope of the invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

This invention also relates to the preparation of ester and amide derivatives of the instant products (I) and includes all such derivatives as are compatible with the body system and whose pharmacological properties will not cause adverse physiological effects. Suitable esters and amides include, for example, the alkyl ester and the amide, monoalkylamide, dialkylamide and heterocyclic amide derivatives as, for example, amides derived from heterocyclic amines as pyrrolidine, piperidine, morpholine, etc.; which esters and amides are prepared in the conventional manner from the corresponding [4-(2,2-diacylvinyl)phenoxy]acetic acid (I) or from the acid halide derivatives thereof by reaction with a suitable alcohol, ammonia, monoalkylamine, dialkylamine or heterocyclicamine.

The foregoing and other equivalent methods for the preparation of the salts, esters and amide derivatives of the instant products (I) will be apparent to those having ordinary skill in the art and, to the extent that the said derivatives are both nontoxic and physiologically acceptable to the body system, the said esters and amides are the functional equivalent of the corresponding [4-(2,2-diacylvinyl)phenoxy]acetic acids (I).

The examples which follow illustrate the [4-(2,2-diacylvinyl)phenoxy]acetic acid products (I) of this invention and the method by which they are prepared. However, the examples are illustrative only and it will be apparent to those having ordinary skill in the art that all of the instant products may be produced in an analogous manner by substituting the appropriate starting materials for those set forth in the examples.

EXAMPLE 1

[2,3-dichloro-4-(2,2-diacetylvinyl)phenoxy]acetic acid

*Step A.*—2,3-dichloro-4-hydroxybenzaldehyde: In a 5 liter, three-necked flask, equipped with a mechanical stirrer, condenser, thermometer and dropping funnel, is placed water (2000 ml.), calcium hydroxide (280 g., 3.78 moles), sodium carbonate (320 g., 3.02 moles) and 2,3-dichlorophenol (142.6 g., 0.875 mole). The resulting suspension is heated on a steam bath to 65° C. and to it is added chloroform (208 g., 1.75 moles), dropwise, with stirring, while maintaining the temperature at 60–70° C. for one hour.

The reaction mixture is chilled in an ice bath and acidified with concentrated hydrochloric acid. The mixture is extracted with ethyl acetate (approximately 3 liters) and the extract is dried over magnesium sulfate. The solvent is removed by distillation under reduced pressure and the solid residue is recrystallized from toluene to obtain 37.8 g. (23%) of 2,3-dichloro-4-hydroxybenzaldehyde, M.P. 177–182° C. Two additional recrystallizations from acetonitrile give 2,3-dichloro-4-hydroxybenzaldehyde in the form of white prisms having a melting point of 184–185° C.

*Analysis.*—Calcd. for $C_7H_4Cl_2O_2$ (percent): C, 44.01; H, 2.11; Cl, 37.12. Found (percent): C, 44.22; H, 2.30; Cl, 37.02.

*Step B.*—3-(2,3-Dichloro-4-hydroxybenzylidene)-2,4-pentanedione: A solution of 2,3-dichloro-4-hydroxybenzaldehyde (19.1 g., 0.1 mole), acetylacetone (11 g., 0.11 mole) and piperidine (3 ml.) in ethanol (75 ml.) is allowed to stand for 25 hours at room temperature. The solution then is diluted with water (75 ml.) and neutralized with concentrated hydrochloric acid. The product which precipitates is recrystallized from a mixture of benzene and ethyl acetate to obtain 12.6 g. (46%) of 3-(2,3-dichloro-4-hydroxybenzylidene) - 2,4 - pentanedione, M.P., 151–153° C.

*Analysis.*—Calcd. for $C_{12}H_{10}Cl_2O_3$ (percent): C, 52.77; H, 3.69 Found (percent): C, 52.74; H, 3.53.

*Step C.*—Tert.-butyl [4-(2,2-diacetylvinyl)-2,3-dichlorophenoxy]acetic acid: A mixture of 3-(2,3-dichloro-4-hydroxybenzylidene)-2,4-pentanedione (2.73 g., 0.01 mole), tert.-butyl bromoacetate (2.15 g., 0.011 mole), potassium carbonate (2.76 g., 0.02 mole) and dimethylformamide (15 ml.) is stirred at 25° C. for 30 minutes and then poured into 50 ml. of water. The resulting solid precipitate is collected on a filter to yield 3.5 g. (90%) of tert.-butyl [4-(2,2-diacetylvinyl) - 2,3-dichlorophenoxy] acetic acid, M.P. 89–94° C.

*Step D.*—[2,3-dichloro-4-(2,2-diacetylvinyl)phenoxy] acetic acid: Tert.-butyl [4-(2,2-diacetylvinyl)-2,3-dichlorophenoxy]acetic acid (3.5 g., 0.009 mole) is dissolved in benzene (35 ml.), p-toluenesulfonic acid (0.3 g.) is added and the solution is refluxed for 10 minutes at 80° C. and then cooled to room temperature. The product which precipitates is collected on a filter and recrystallized from ethyl acetate to yield 2.0 g. (67%) of [2.3-dichloro-4-(2,2-diacetylvinyl)phenoxy]acetic acid, M.P. 184.5–186.5° C.

*Analysis.*—Calcd. for $C_{14}H_{12}Cl_2O_5$ (percent): C, 50.77; H, 3.65; Cl, 21.41. Found (percent): C, 50.78; H, 3.77; Cl, 21.27.

In a manner similar to that described in Example 1 for the preparation of [2,3-dichloro-4-(2,2-diacetylvinyl) phenoxy]acetic acid all of the products of this invention may be obtained. Thus, by substituting the appropriate phenol (Va, infra), diacylmethane and tert.-butyl haloacetate for the 2,3-dichlorophenol, acetylacetone and tert.-butyl bromoacetate of Example 1, Steps A, B and C, respectively, and following the procedure described in Steps A–D of that example all of the tert.-butyl [4-(2,2-diacylvinyl)phenoxy]acetic acid starting materials (IIa, infra) and [4-(2,2-diacylvinyl)phenoxy]acetic acid products (Ia, infra) of this invention may be obtained. The following equation illustrates the reaction of Example 1, Steps A–D and, together with Table I, infra, depict the starting materials of the instant process and the corresponding products (Ia) derived therefrom:

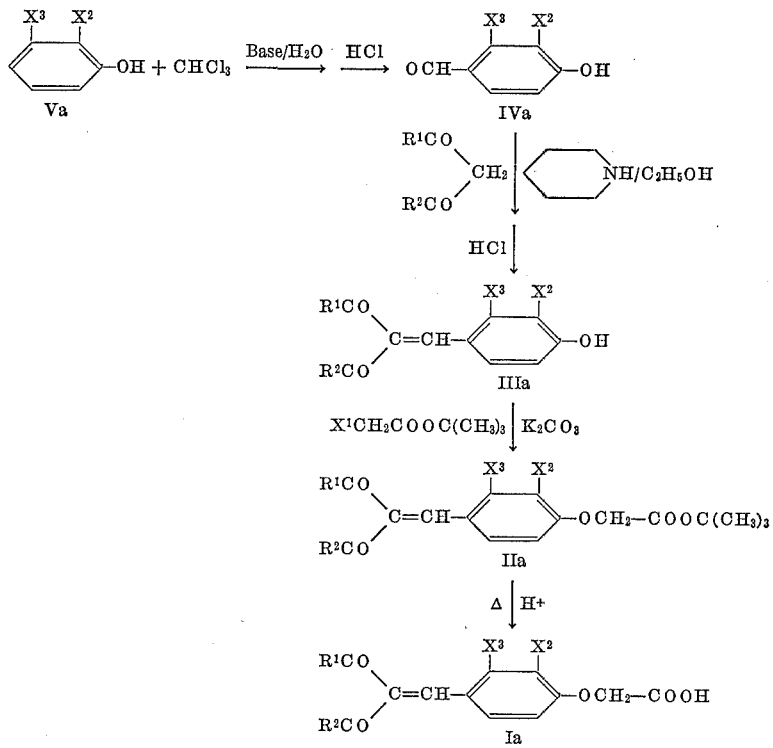

TABLE I

| Example | $R^1$ | $R^2$ | $X^1$ | $X^2$ | $X^3$ | M.P. of Ia, ° C. |
| --- | --- | --- | --- | --- | --- | --- |
| 2 | —CH₃ | —CH₃ | Br | —CH₃ | —CH₃ | 168.5–170.5 |
| 3 | —CH₃ | —CH₃ | Cl | H | Cl | 158–161 |
| 4 | —CH₃ | —CH₃ | Br | —CH=CH—CH=CH— | | 185.5–188.5 |
| 5 | —C₂H₅ | —C₂H₅ | Br | Cl | Cl | 185.5–186.5 |
| 6 | —C₂H₅ | —C₂H₅ | Cl | Cl | Cl | 168–170 |
| 7 | —CH₃ | CH₃ | Br | H | H | 172.5–174.5 |

The products (I) of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5,10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a [4-(2,2-diacylvinyl)phenoxy]acetic acid or a suitable acid addition salt, ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the prepation of a representative dosage form:

EXAMPLE 8

Dry-filled capsules containing 50 mg. of active ingredient per capsule

|  | Per capsule, mg. |
|---|---|
| [2,3 - dichloro - 4 - (2,2 - diacetylvinyl)phenoxy] acetic acid | 50 |
| Lactose | 144 |
| Magnesium stearate | 6 |
| Capsule size No. 3 | 200 |

The [2,3-dichloro-4-(2,2-diacetylvinyl)phenoxy]acetic acid is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the [4-(2,2-diacylvinyl)phenoxy]acetic acid products of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A process for preparing a compound having the formula:

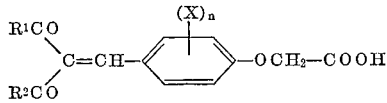

wherein $R^1$ and $R^2$ are lower alkyl; the X radicals are similar or dissimilar members selected from hydrogen, halogen, lower alkyl and, taken together, two X radicals on adjacent carbon atoms of the benzene ring may be joined to form a 1,3-butadienylene chain; and $n$ is an integer having a value of 1–2; which consists in heating a compound of the formula:

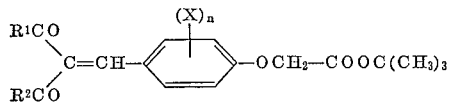

wherein $R^1$, $R^2$, X and $n$ are as defined above, at a temperature of from about 70 to 140° C. in the presence of an acid selected from p-toluenesulfonic acid, sulfuric acid, benzenesulfonic acid and gaseous hydrogen chloride, either in the absence of a solvent or in a non-aqueous medium.

2. The process of claim 1 wherein the temperature employed is in the range of 80–100° C.

3. The process of claim 1 wherein the acid employed is p-toluenesulfonic acid.

4. The process of claim 1 wherein X is halogen.

5. The process of claim 1 wherein X is lower alkyl.

6. The process of claim 1 wherein two X radicals on adjacent carbon atoms of the benzene ring may be joined to form a 1,3-butadienylene chain.

7. A process according to claim 1 for preparing a compound having the formula:

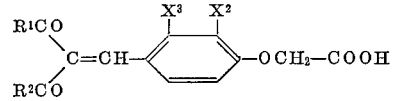

wherein $R^1$ and $R^2$ are lower alkyl and $X^2$ and $X^3$ are halogen; which consists in heating a compound of the formula:

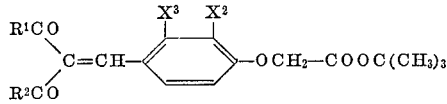

wherein $R^1$, $R^2$, $X^2$ and $X^3$ are as defined above at a temperature of from about 80 to 100° C. in the presence of an acid selected from p-toluenesulfonic acid, sulfuric acid, benzenesulfonic acid and gaseous hydrogen chloride, either in the absence of a solvent or in a non-aqueous medium.

8. The process of claim 7 wherein $R^1$ and $R^2$ are ethyl.

9. The process of claim 7 wherein $X^2$ and $X^3$ are chloro.

10. A process according to claim 7 for preparing [2,3-dichloro-4-(2,2-diacetylvinyl)phenoxyl]acetic acid which consists in heating tertiary-butyl [4-(2,2-diacetylvinyl)-2,3-dichlorophenoxy]acetic acid in the presence of p-toluenesulfonic acid.

References Cited

UNITED STATES PATENTS 3,255,241   6/1966   Schultz _____ 260—516

OTHER REFERENCES

Migrdichian, Organic Synthesis. pp. 336–339.

LORRAINE A. WEINBERGER, Primary Examiner

E. J. GLEIMAN, Assistant Examiner

U.S. Cl. X.R.

260—473, 520; 424—317